US006424135B1

(12) United States Patent
Russo

(10) Patent No.: US 6,424,135 B1
(45) Date of Patent: Jul. 23, 2002

(54) HIGH POWER DRIVE FROM AC AND DC SOURCES USING CRYOELECTRONICS

(75) Inventor: Carl J. Russo, Westlake, OH (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/592,303

(22) Filed: Jun. 13, 2000

Related U.S. Application Data

(63) Continuation of application No. 08/698,942, filed on Aug. 16, 1996, now Pat. No. 6,097,181, which is a continuation-in-part of application No. 08/384,780, filed on Feb. 6, 1995, now Pat. No. 5,612,615, which is a continuation-in-part of application No. 08/302,354, filed on Sep. 7, 1994, now abandoned, which is a continuation of application No. 07/934,036, filed on Aug. 21, 1992, now Pat. No. 5,347,168.

(51) Int. Cl.[7] .......................... H01F 36/00; H02M 1/10
(52) U.S. Cl. ................ 323/360; 323/141; 327/366; 333/995
(58) Field of Search ................ 323/360, 141; 327/366; 333/995

(56) References Cited

U.S. PATENT DOCUMENTS

| 3,479,569 | A | | 11/1969 | Prost et al. ................ 317/123 |
|---|---|---|---|---|
| 3,479,576 | A | | 11/1969 | Satterthwaite et al. |
| 3,818,390 | A | | 6/1974 | Gikow et al. ................ 334/68 |
| 3,835,369 | A | | 9/1974 | Zoleta ........................ 323/44 F |
| 4,082,991 | A | | 4/1978 | Constant ........................ 320/1 |
| 4,122,512 | A | | 10/1978 | Peterson et al. ............... 363/14 |
| 4,348,630 | A | | 9/1982 | Boenig et al. ............... 323/207 |
| 4,348,710 | A | * | 9/1982 | Woods ........................ 361/141 |
| 4,414,461 | A | | 11/1983 | Wolf ........................... 219/121 |
| 4,912,446 | A | | 3/1990 | Singh et al. .................... 336/62 |
| 4,962,354 | A | | 10/1990 | Visser et al. ................. 323/360 |
| 5,087,610 | A | | 2/1992 | Hed ................................ 508/1 |
| 5,099,152 | A | | 3/1992 | Suzuki ........................ 307/476 |
| 5,118,660 | A | * | 6/1992 | Riebman ........................ 505/1 |
| 5,146,383 | A | | 9/1992 | Logan ........................... 361/19 |
| 5,181,170 | A | * | 1/1993 | Huang et al. .................. 363/21 |
| 5,347,166 | A | * | 9/1994 | Schauder ..................... 307/113 |
| 5,347,168 | A | | 9/1994 | Russo ........................ 307/245 |
| 5,400,668 | A | * | 3/1995 | Hatori et al. .............. 73/865.9 |
| 5,612,615 | A | * | 3/1997 | Gold et al. .................. 323/360 |

* cited by examiner

Primary Examiner—Bao Q. Vu
(74) Attorney, Agent, or Firm—Fish & Richardson P.C.

(57) ABSTRACT

A method and apparatus for powering a high power load (on the order of 50,000 watts or more) can have an input from any of a plurality of different voltage sources, AC or DC. In one embodiment, the AC sources can have a frequency in the range of 16⅔–60 Hertz, and voltages in the range of 480–38,000 volts. The method and apparatus feature cryo-cooling inverter electronics, which converts an input signal to a high frequency high voltage signal, to, for example, less than about 180 K. A high frequency transformer receives the high frequency high voltage signal and transforms it into a desired voltage level which can then be filtered and/or demodulated and applied to the load. The transformer is preferably comprised of a superconducting material, and then, the inverter and transformer, at least, are actively cooled as required. In a particular embodiment, the circuitry replaces the heavy transformer construction used in driving induction motors in an electric traction engine from an overhead line or a third rail. This system can also employ an interlink between the rectified DC and the inverter for energy storage and smoothing effects.

32 Claims, 9 Drawing Sheets

HIGH POWER DRIVE FROM AC AND DC SOURCES USING CRYOELECTRONICS

CROSS-REFERENCE TO RELATED APPLICATION

This application is a continuation of U.S. Ser. No. 08/698,942, filed Aug. 16, 1996, now U.S. Pat. No. 6,097,181 entitled "HIGH POWER DRIVE FROM AC AND DC SOURCES USING CRYOELECTRONICS".

This application is a continuation-in-part of U.S. Ser. No. 08/384,780, filed Feb. 6, 1995 now U.S. Pat. No. 5,612,615, entitled, "CRYOGENIC ELECTRONICS POWER SUPPLY" which is a continuation-in-part of U.S. Ser. No. 08/302,354, filed Sep. 7, 1994, and entitled "CRYOGENIC ELECTRONICS POWER SUPPLY AND POWER SINK", now abandoned, which is a continuation of 07/934,036, filed Aug. 21, 1992, and entitled "CRYOGENIC ELECTRONICS POWER SUPPLY AND POWER SINK", now U.S. Pat. No. 5,347,168.

BACKGROUND OF THE INVENTION

The invention relates generally to methods and apparatus for driving loads at high power levels from different power sources, and in particular, to a method and apparatus for driving an induction motor from sources having different voltages and frequencies.

European railway trains, which operate from overhead lines, and in several countries, must operate at several different voltages and frequencies. In current practice, this means that every voltage and frequency requires a separate transformer. These transformers take up nearly the entire engine compartment, and sometimes that of a second vehicle as well, because of the power requirements of the transformer are typically in the three to eight megawatt range.

In particular, traction engines in Germany use an overhead transmission line operating at 16⅔ Hz, at 25 kilovolts. The engine is connected to the source of power by a pantograph which connects to an 8,000 volt-ampere power transformer, rectifier, filter, and three phase inverter which drives the induction traction motors of the train. Interestingly, however, in Germany many of the trains must meet a requirement that the traction engine operate on up to a 4% grade. This relatively steep grade adds weight to German traction engines (due to the larger motor and transformer requirement) and can put them at a severe disadvantage compared to French engines. In particular, the additional weight is sufficient to put German traction engines, which have a weight of 1.9 tons per axle, beyond the 1.7 tons per axle limit for trains allowed to operate in France. Thus, the German engines and hence the German railroad system is at a competitive disadvantage in France since they must use French traction engines to complete some journeys.

It would thus be desirable to provide a solution which reduces the weight of the German engine while at the same time continuing to enable it to operate at voltages and frequencies of different sources. Such a change in the engine compartment of the traction engine would also have equally useful effectiveness in other fields where weight and size are important, and where multiple voltage sources (for example ranging from 480 to 38,000 volts) and frequencies must be accommodated, such as large power supplies and for use with power distribution applications (particularly where the input is constant and different output voltages and configurations are needed). This problem is particularly applicable to the European railway system because of the large cumulative or aggregate size and weight of the transformers needed to operate in various countries, and in particular, as noted above, at substantial grades.

SUMMARY OF THE INVENTION

The invention relates, in one aspect, to a method and apparatus for powering a high power load such as an induction motor system having an input of at least 100 horsepower from any one of a plurality of different voltage sources, the AC sources having a frequency in a range of allowable frequencies. The method of the invention features the steps of rectifying an AC input power for generating a first DC output power signal, storing energy at the first DC output power signal using an interlink energy storage circuit having inductive and/or capacitive component(s), modulating the isolated DC output power signal at a high frequency, transforming the high frequency power signal to a selected voltage level, filtering (with or without demodulating) the transformed high frequency signal, and applying the filtered power signal to a load, for example, to operate the at least 100 horsepower induction motor. In some processes where the input to the filter has unwanted modulation, demodulation can be inserted prior to the filtering step; however as used in this application "filtering" is typically meant to encompass the non-linear demodulation process, if present, as well as the typical filter or smoothing process which can involve separate circuitry or be inherent in the load. Also, the transforming step may not be necessary, but if present, can be accomplished by a high frequency, preferably superconducting, transformer. The method is also applicable to non-rail environments wherein the load will typically not be an induction motor and thus may not have the inductive characteristics of the induction motor.

This method is particularly useful because it allows the transforming step, previously performed at a low frequency, to be performed at a much higher frequency. The higher frequency enables the transformer to be of a significantly reduced size. Further, by removing the frequency dependence of the source, by translating the source to a DC signal when the source is an AC signal, only a single transformer may be required for various input frequencies and voltage levels (or a signal source having multiple AC frequencies simultaneously).

The apparatus of the invention features a rectifier circuit for rectifying any AC input power to a first DC output power signal, a storage inductor and/or capacitor for receiving and acting upon the first DC signal, an inverter for receiving the inductor and/or capacitor output and generating a high frequency output signal corresponding to the inductor and/or capacitor output, at a high power; a high frequency power transformer transforming the high frequency power signal to a selected voltage level, a filter (with or without a demodulation capability as noted above) for filtering the transformed signal, whereby the filtered signal can be applied to drive a load, such as the at least 100 horsepower induction motor. As noted above, in non-rail applications, the load need not be an induction motor. In the rail application, however, if ride quality is not a major consideration, motor construction techniques can enable the motor, itself, to act as the filter (to remove high frequencies). Also, in future, other motor topologies, such as synchronous motors, may be used in rail applications.

Preferably, the invention is capable of supplying greater than 100 watts, and in particular, greater than 50,000 watts of power. Preferably, also, portions of the components are actively cooled to at least a temperature below the dew point of the surrounding air, and in a protected environment. The advantages of the invention are increased when the cooled components are cooled to less than 230 K, preferably less than 180 K and most preferably, 150 K.

BRIEF DESCRIPTION OF THE DRAWINGS

Other objects, features, and advantages of the invention will be apparent from the following description, taken together with the drawings in which.

DESCRIPTION OF PARTICULAR PREFERRED EMBODIMENTS

European railway trains which operate from overhead lines, and which operate in several countries, must be compatible with several different voltages and frequencies. Typically, this requirement has meant that every voltage and frequency combination required a separate transformer in the three-eight MW size range. These transformers can take up the entire engine compartment, and sometimes even that of a second vehicle as well. On the other hand, they enable the engine to operate over voltages of, typically, up to 38 kilovolts, and at frequencies from about 16⅔ hertz to 50 hertz. These transformers must be capable of driving up to about 8,000 horsepower of traction motors, including their conversion inefficiencies, and this accounts for their large volume and weight, as well as their expense.

Figure 1:
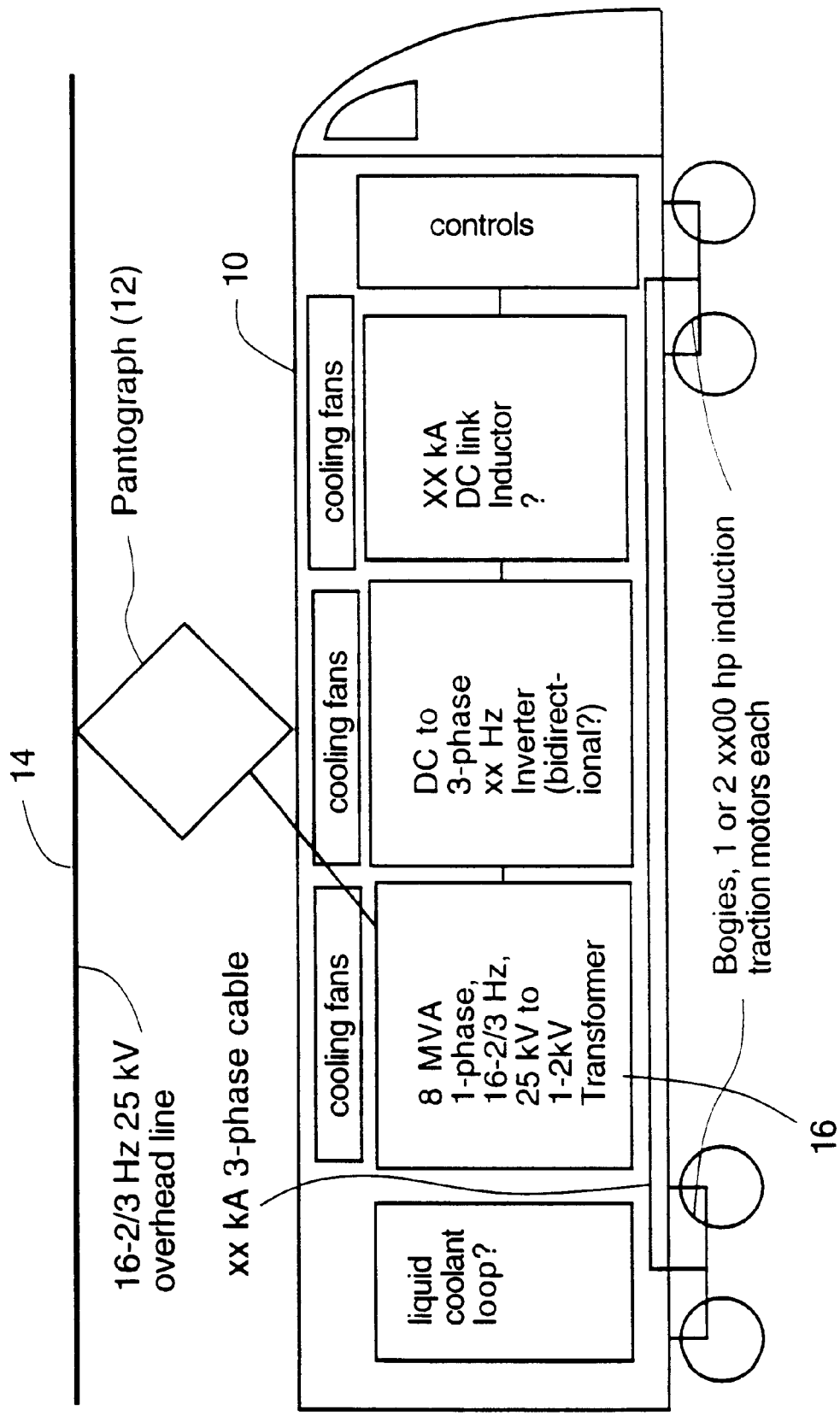
FIG. 1 is a diagrammatic representation of a typical prior art apparatus for driving an induction motor from multiple sources of energy.

In accordance with one aspect of the invention, referring to FIG. 1, a railroad engine 10 will contain a cryocooled electronics package, including linking and conversion elements, which enable the engine 10 to operate from various voltages and frequencies. A pantograph 12 contacts an overhead line 14 which is the source of power. Line 14 can be, for example, a 25 kilovolt, 16⅔ hertz AC power source. It may also operate at different voltages and frequencies, and in some instances, can be a DC power source. (A typical DC source may also be provided over a "third rail.") The typically single-phase AC power from the overhead line 14 is converted by cryocooled conversion circuitry 16, the output of which generates a three-phase output for the motor using a pulse width modulated (PWM) power output to drive the large induction traction motors 20 of the engine 10. Other alternatives may also be considered. For example, 6 to 48 pulse output rather than PWM may be a better alternative in some applications. A DC interlink (energy storage) circuit 22 having energy storage components such as an inductor, a capacitor, or an inductor/capacitor combination, can provide interconnection between the pantograph and the converter 16.

In other embodiments of the invention, other types of traction motors such as synchronous motors may be desirable. In addition, other loads can be provided beside the motor loads illustrated in figures. In such cases, the concept of the invention still applies and the ability to provide flexibility, both as to the input voltage and frequency, as well as to output voltage and frequency, are well within the skill of those practiced in the power supply and power distribution field.

As it is described in U.S. Pat. No. 5,347,168, issued Sep. 13, 1994, and entitled Cryogenic Electronics Power Supply and Power Sink, the contents of which are incorporated, in their entirety, herein by reference, it is well known that the operation of various semiconductor devices, including, in particular, Mosfets, operating at a temperature of 77 K, provides significant advantages, such as the reduction of "on" resistance of the Mosfet by as much as a factor of 30. Cryocooled electronics also have been considered for enhanced noise performance of amplifiers and to speed up various circuitry. Cryocooling of the circuitry, in particular, for example, power supply circuitry, yields a substantial size reduction as well. Thus, smaller components, operating at 300 to 30,000 times the frequency of older power supplies, enable substantial reductions in physical size to be achieved. This is particularly useful in connection with the induction motor driven traction engines 10 where the reduction in size, and the concomitant reduction in weight, provides significant advantages in connection with European trains. Also, dryselectronics typically has substantial current-overload capability when compared to conventional electronics. This is useful during train startup conditions, and when climbing steep grades when maximum torque is required at nearly full short circuit current.

As noted in U.S. Pat. No. 5,347,168, advantages of cryogenically cooling an entire circuitry, thereby achieving faster response time and lower "turn-on" resistance, can typically overcome by the refrigeration penalty in the design of high power generating circuits. Thus, power supplies, whose output power exceeds 50 kilowatts, can advantageously be built using cryocooled circuits. In the application to which the present invention is particularly directed, that of enabling high capacity induction motors (for example 8000 total horsepower in four to eight motors) to be operated from a variety of voltage sources and of different frequencies, the refrigeration penalty is clearly overcome; however, more importantly, the reduction in the weight and size of the system can be substantial, thereby overshadowing the efficiency of the system. As a result, it has been found possible to eliminate the many expensive, large, and heavy transformer elements in the prior art engines 10, and to replace them with the much lighter, smaller, and more efficient (even when the refrigeration penalty (and the refrigeration equipment associated therewith) are taken into account) cryogenically cooled power supply circuitry of the present invention.

In the various embodiments which follow, the great flexibility and versatility of the described invention will become apparent. Starting with either an AC or DC energy source, of varying voltage and frequency, the invention allows the efficient transformation of this power (up to 8 megawatts in some embodiments) to be converted into the necessary frequency (phase) or pulse width modulation (PWM) signals which the induction motors typically are used to receiving. As illustrated in the varying embodiments, not all elements are necessary for every application, nor need the load be the induction motors to which most of the embodiments are directed. Accordingly, referring to FIG. 2, a first fully developed and all inclusive embodiment will be described.

It is also important to note that not all components need to be cryocooled to the same temperature, and when superconductive components are not used, commercial practicality may dictate that cryocooling the inverter circuit to less than 230 K, preferably less than 180 K, and most preferably to about 150 K, will be sufficient to achieve most of the advantages of this invention. In fact, the advantages of the invention are apparent when components such as inverters, are actively cooled in a protective environment, to a temperature below the dew point of the surrounding air. Accordingly, as used in this disclosure, "cyrocooling" is used to include active cooling of components of the system.

Figure 2:
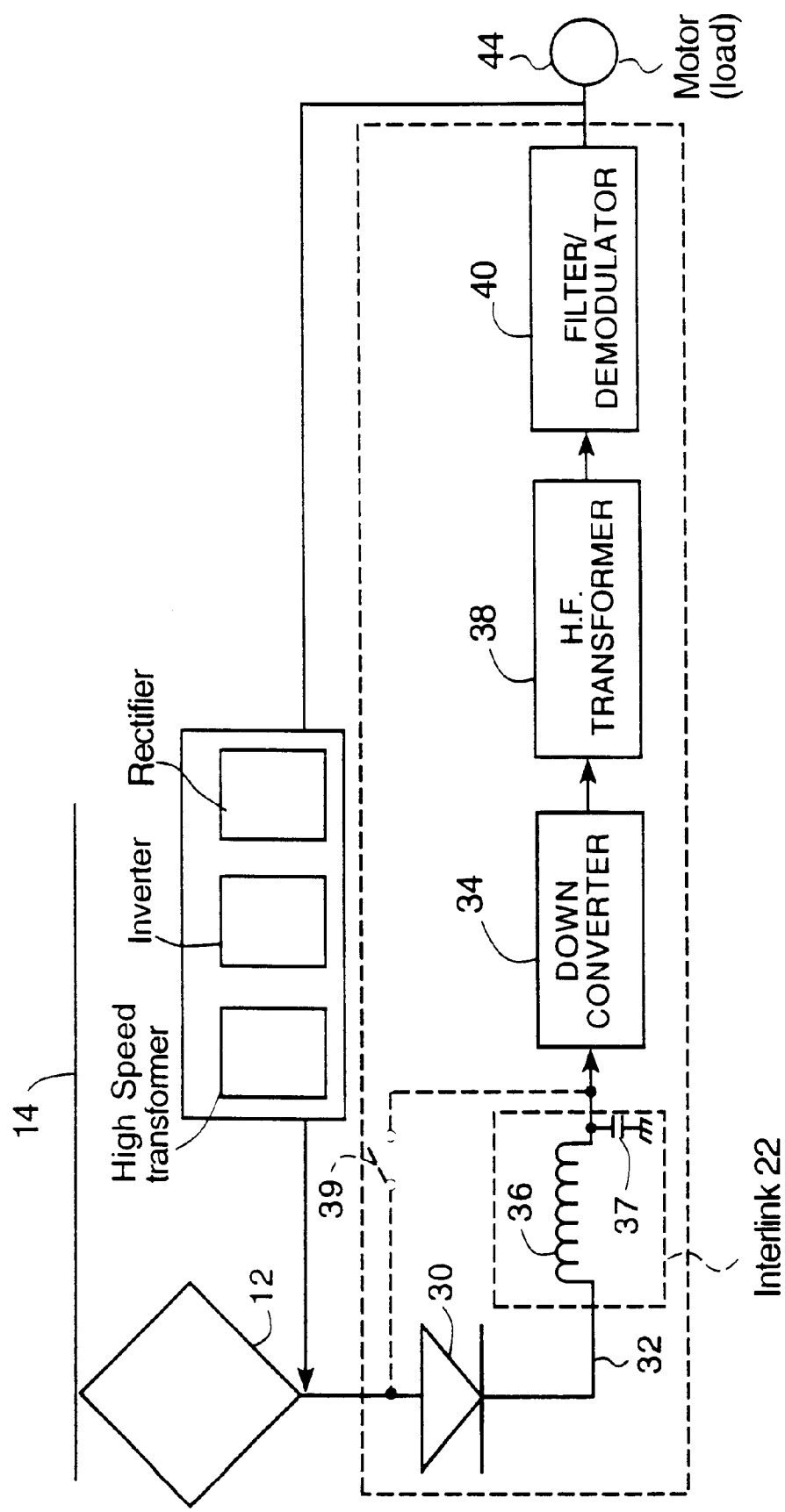
FIG. 2 is a diagrammatic representation, in accordance with the invention, of a system for driving an induction motor.

Referring to FIG. 2, therefore, the pantograph 12 receives power from the high voltage overhead line 14. The power can be either AC or DC. If the power is AC of higher voltage than that required by the traction motors, it is rectified by a rectifier circuitry designated 30. The rectifier circuitry can provide either half-wave or a full-wave rectification, depending upon the requirements of the system. The rectified output of the rectifier circuitry, over a line 32, a high voltage variable signal, is linked to a down converter, an inverter 34, here through an inductor/capacitor interlink circuit 22 having an inductor 36 and a capacitor 37. In a preferred embodiment of the invention the inductor is a high temperature superconductor as is well known in the art. The inductor/capacitor interlink circuit provides DC linkage and energy storage and smoothing between the rectifier circuitry and the down converter. (In other embodiments of the interlink circuit, where only a large inductor (acting like a current source) and no capacitor are used, devices with three quadrant operation (such as SCR's) will be required.)

Figure 3:
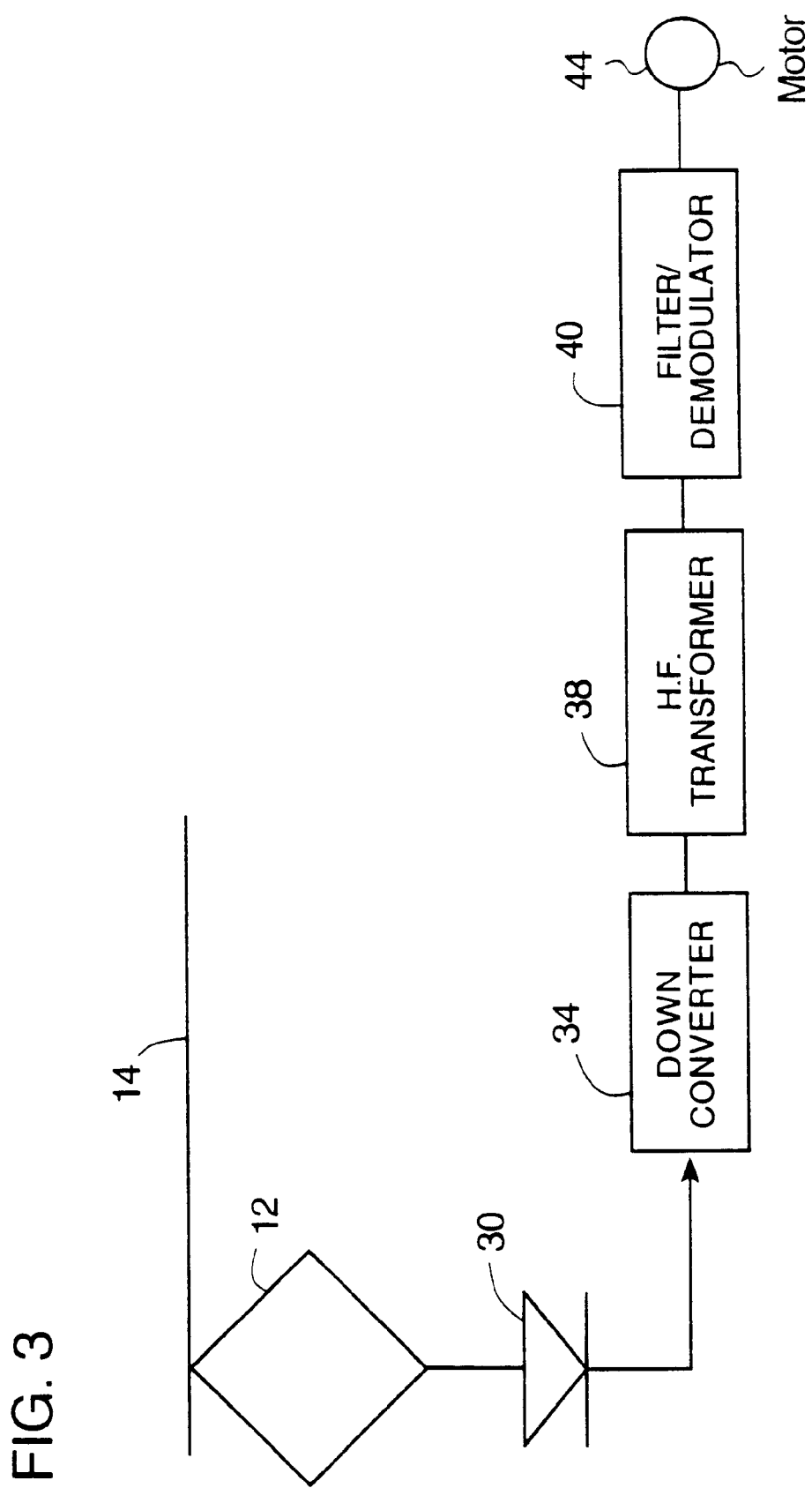
FIG. 3 is a circuit for a more detailed schematic circuit depicting a first embodiment for driving an induction motor in accordance with the invention.

In particular embodiments of the invention, such as that illustrated in FIG. 3, the interlink circuit need not be employed. In that instance, the output of the rectifier circuitry 30 is applied directly to the down converter 34. Further, in other embodiments of the invention, when the power source is a DC source, a switch 39, shown in dashed lines in FIG. 2, can be used to by-pass the rectifier circuitry and the storage or interlink circuit, if present, and apply the input power from the pantograph directly to the down converter 34.

Depending on the construction of the interlink energy storage elements, the down converter 34 can be any of a plurality of known down conversion circuits which convert or modulate the rectified or DC input to a high frequency AC output. The down converter thus can be a resonant mode converter, or a Buck step down converter with a conventional or cryogenically cooled, high frequency, isolation transformer 38. Preferably, the transformer is, as illustrated in this embodiment, a superconducting, cryogenically cooled unit. The Buck converter, for example, is described in detail in U.S. Pat. No. 5,347,168.

The down converter or inverter 34 is preferably actively cooled as described in U.S. Pat. No. 5,347,168 for the reasons noted there. The inverter thus, in effect, modulates the DC input signal and has improved power handling characteristics as it is cooled. As noted above, active cooling effects a cooling to a temperature at least below the dew point of the surrounding air and preferably to cryogenic temperatures less than 230 K, and more preferably less than 180 K. The inverter's output, a lower voltage alternating high frequency signal, at, for example, 8 kilohertz in this application, passes to the high frequency transformer 38. As noted above, the high frequency transformer 38 is preferably also cryogenically cooled and made of a superconducting material to provide both higher efficiency and higher current carrying capability, while having a reduced physical size. The physical size is reduced not only because of the superconductive material of which the transformer is made, but also because of the higher frequency at which the transformer operates, when compared to the low frequency copper winding transformers currently used in, for example, the traction driven engines of Europe.

Referring again to FIG. 2, the apparatus can further employ a regeneration circuit 60 so that when the induction motors are used for braking the motion of the vehicle, the energy thus generated is converted back into a form whereby it is returned to the overhead wire 14. The regeneration process is well known to those working in this field, and is a well-known byproduct of the vehicle braking process. It can therefore be optionally added, as illustrated in FIG. 2, to the system thus recited, and provide a greater overall operating efficiency for the drive system. (Note that the regeneration circuit, in accordance with the invention, typically requires a rectifier/inverter/transformer combination comparable to elements 30, 34, 38 of, for example, the embodiment of FIG. 2. This enables the AC power, perhaps multi-phase, generated by the induction motors upon braking to be rectified and converted to the correct voltage and phase for return to the overhead line 14. The regeneration concept is well known to those of skill in this field, although the circuitry in accordance with the invention, as well as cooling the regeneration circuitry and making the transformer both a high-frequency element and of superconducting material is new. In many situations, the power which might be obtained from the regeneration process may not be worthwhile in view of the cost of the additional circuitry, both in expense as well as size and weight when compared to additional mechanical braking components.)

Figure 4:
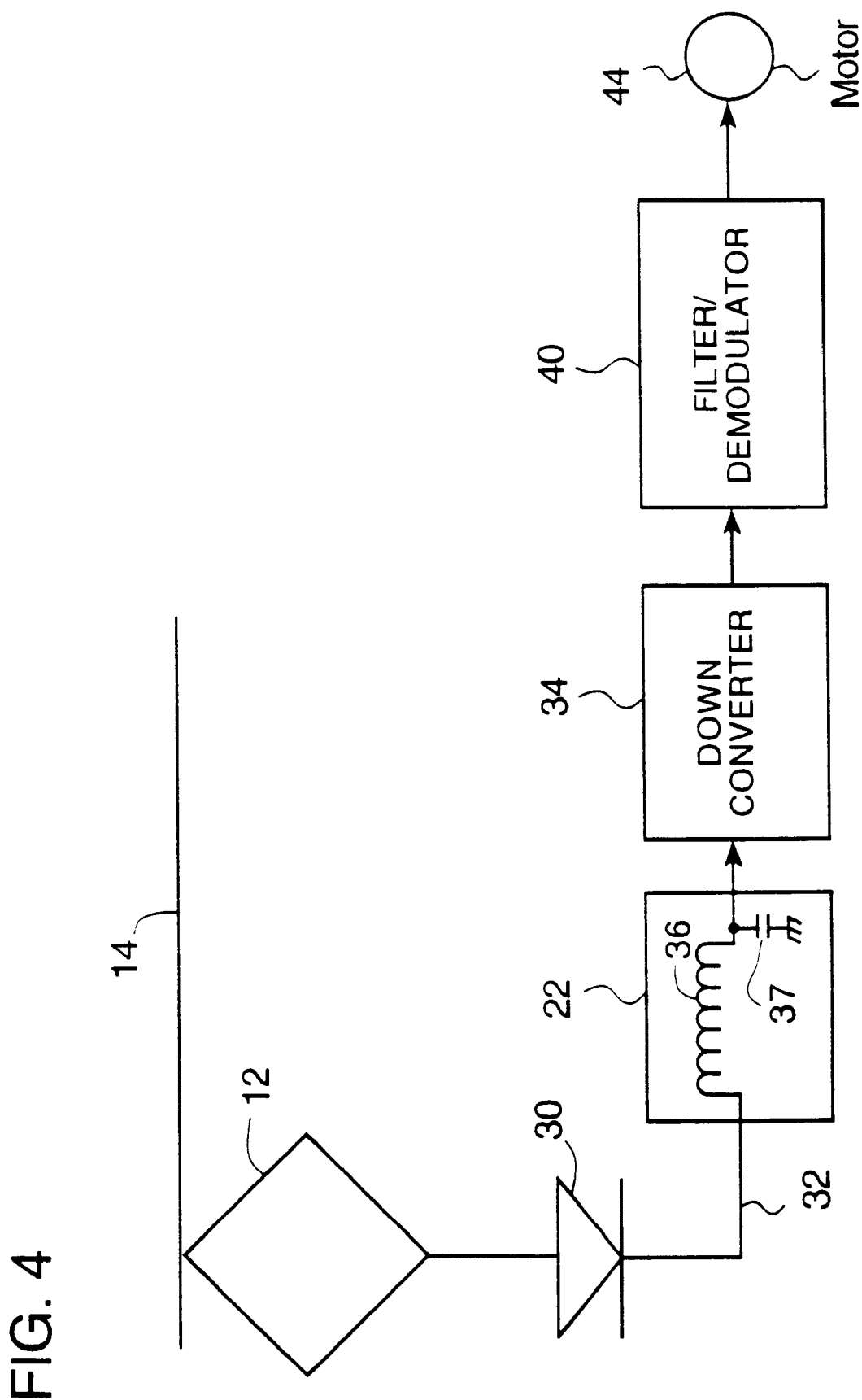
FIG. 4 is a second embodiment for driving an induction motor in accordance with the invention.

Referring to FIG. 4, the high frequency transformer may not be needed, depending upon the voltage requirements of the circuitry driving the induction motors. The need for the high frequency transformer 38 also depends upon the voltage available from the overhead line 14. In any event, the output of the high frequency transformer, or if there is no transformer as illustrated in the embodiment of FIG. 4, of the inverter 34, typically requires some filtering to eliminate spurious frequency components which cause distortion in the output signal so that it can be directed to a pulse width modulation driver 42 or a three-phase variable frequency driver 43 as is well known in the art. These components are typically not cryocooled in the illustrated embodiment of the invention. The filtering element 40 can be employed also to eliminate modulation artifacts which occur in the down conversion process.

Figure 5:
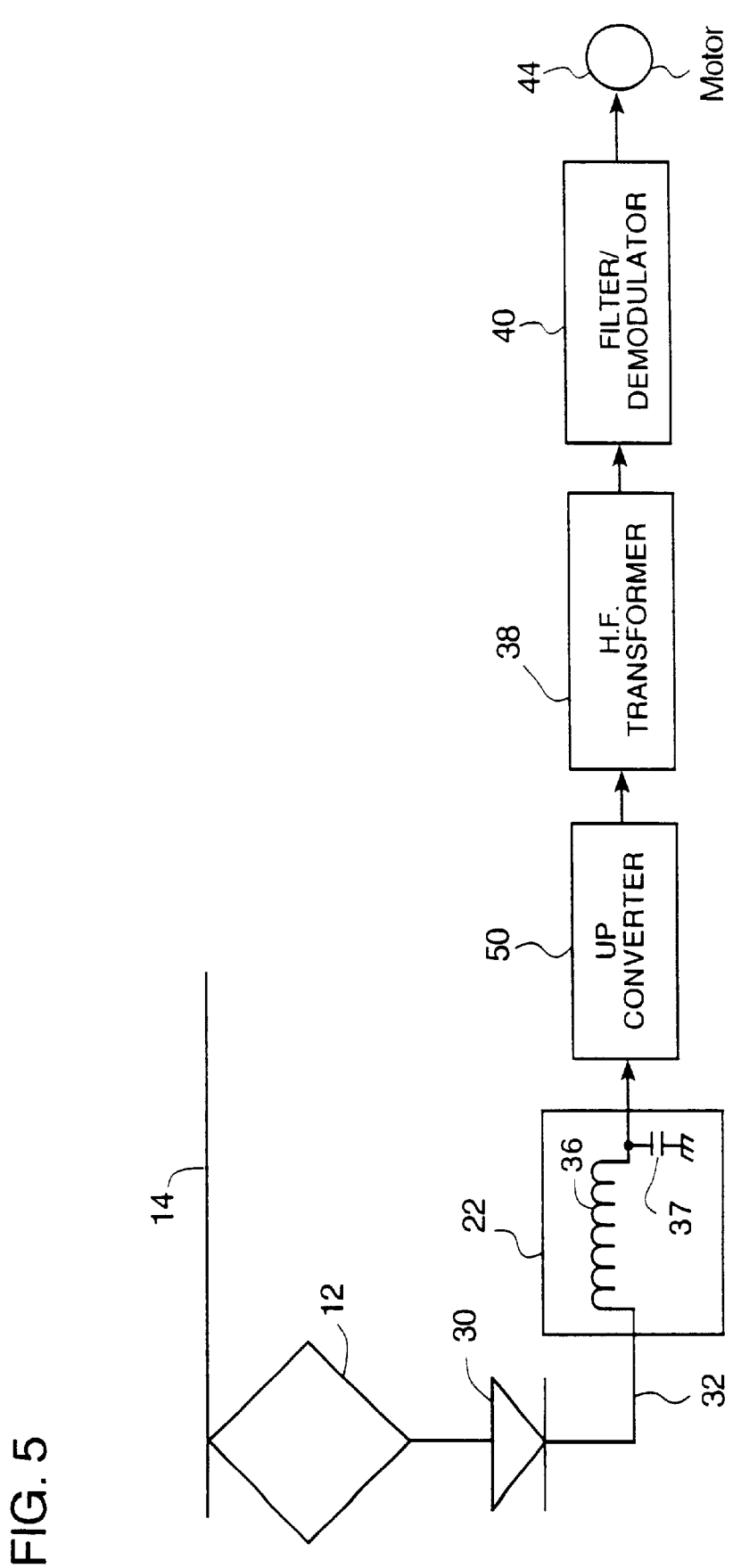
FIG. 5 is a third embodiment for driving an induction motor in accordance with the invention.

Referring to FIG. 5, in some applications of the invention, the actual voltage available from overhead line 14 may be too small to drive the load presented by motors 44, and may require that down converter 34 be replaced by an up converter 50. In this embodiment, the remaining elements of the system remain the same except that elements of the interlink circuit 22 and the inverter 34 are reconfigured so that the voltage is increased to properly drive the induction motors 44. (Alternately, the high frequency transformer can be provided with one or more voltage taps to provide the proper output voltage. This is illustrated in FIG. 8.)

Figure 6:
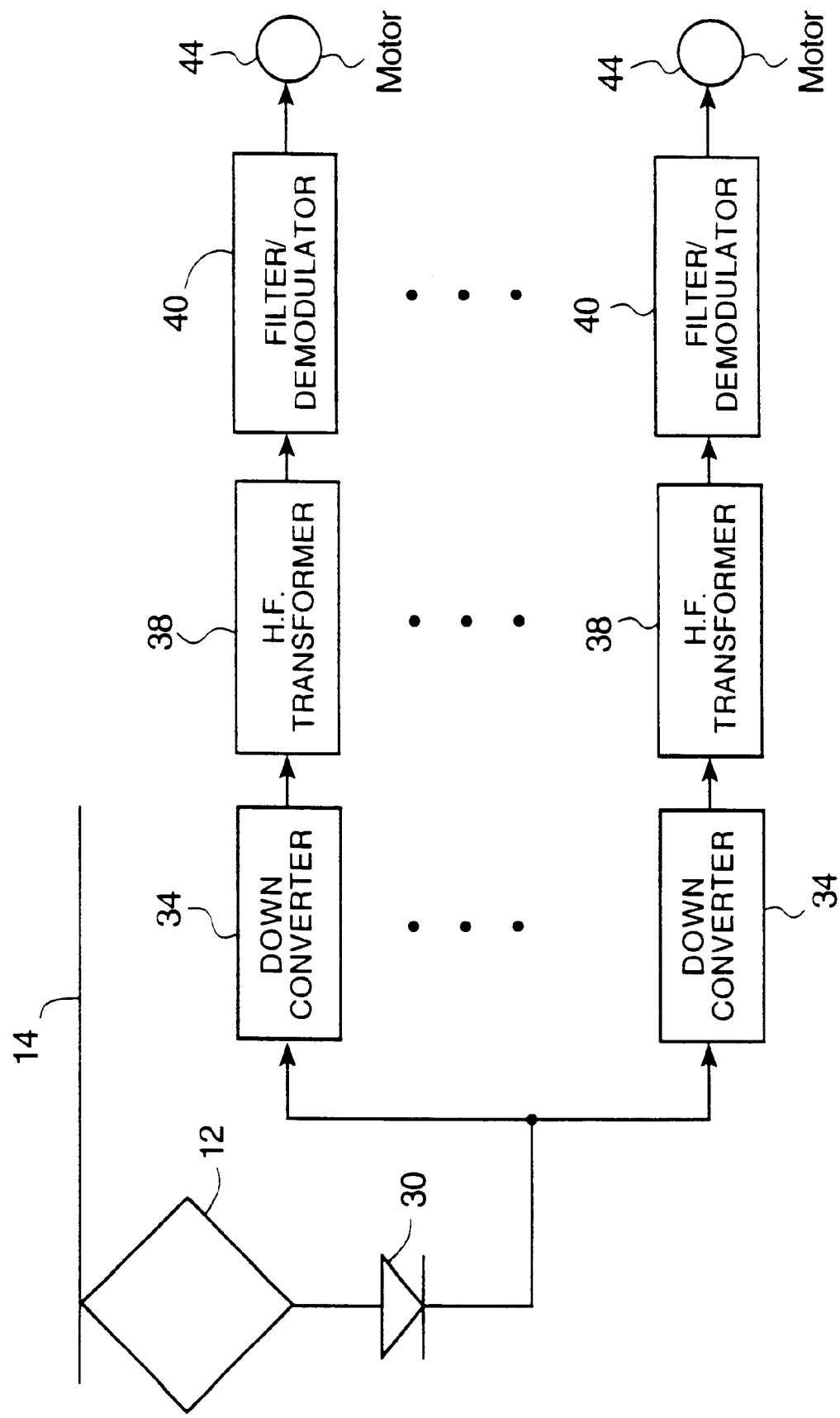
FIG. 6 is a fourth embodiment for driving an induction motor in accordance with the invention.

Referring to FIG. 6, in an alternate embodiment of the invention, a plurality of down converters 34 are provided, one for each of the different frequency-voltage combinations which will be input to the system. In this way, each of the down converters can be particularly tuned to the incoming rectified or DC signal power input and provide a higher efficiency operation.

Figure 7:
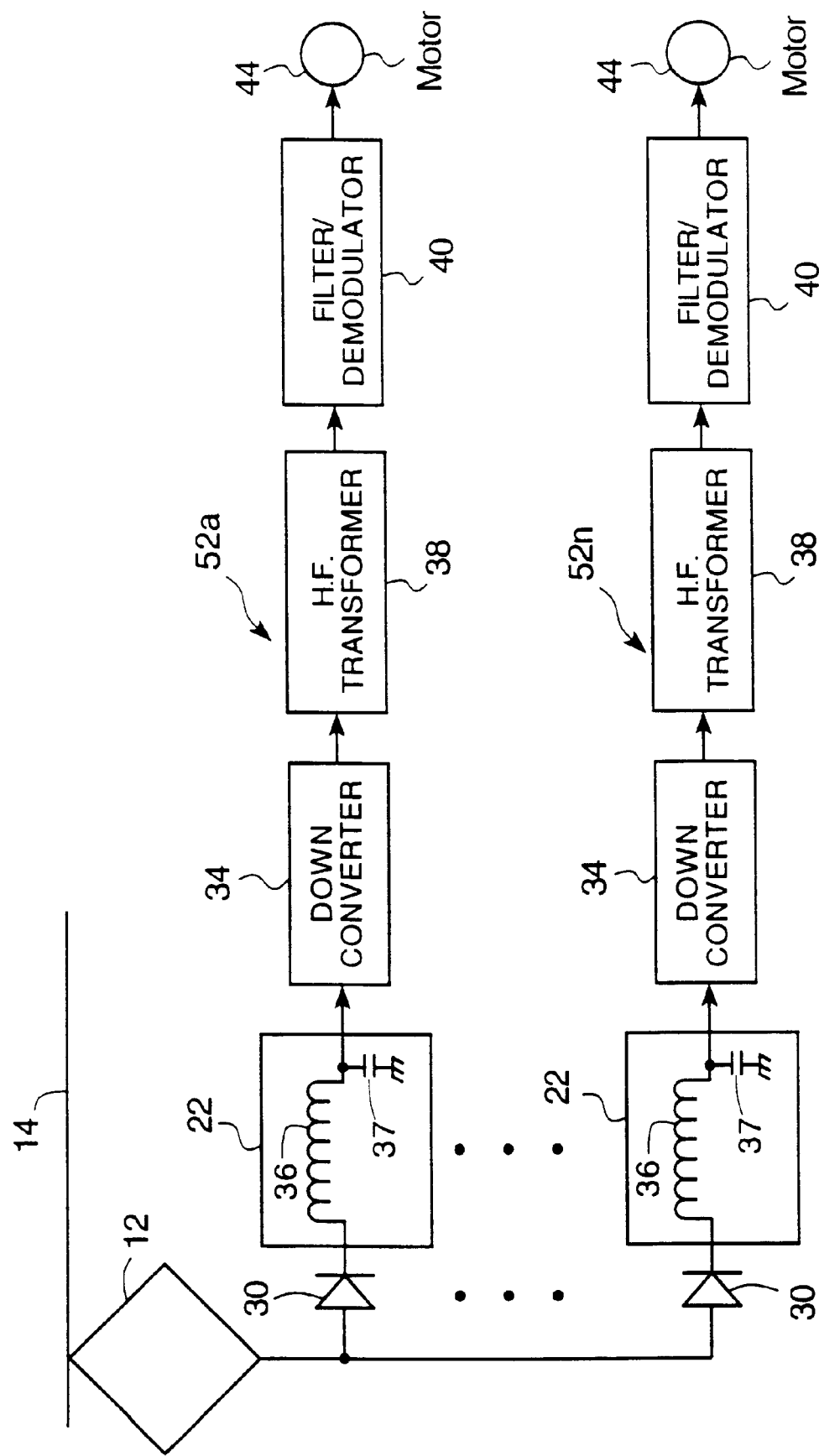
FIG. 7 is a fifth embodiment of a circuit for driving an induction motor in accordance with the invention.

In yet another embodiment of the invention, referring to FIG. 7, a separate rectification circuit 30 and interlink circuit 23 are provided with each of a plurality of the down converters 34 (from FIG. 6) to better enable the system to handle the different incoming power signals. The separate rectification circuitry 30 is made available to each power conversion path 52a, . . . , 52n, to provide different rectification depending upon the quality, frequency, and voltage of the incoming power. In each of these embodiments, however, the conversion circuitry is preferably cryocooled to improve the efficiency and power handling capability while at the same time reducing size and overall weight.

Figure 8:
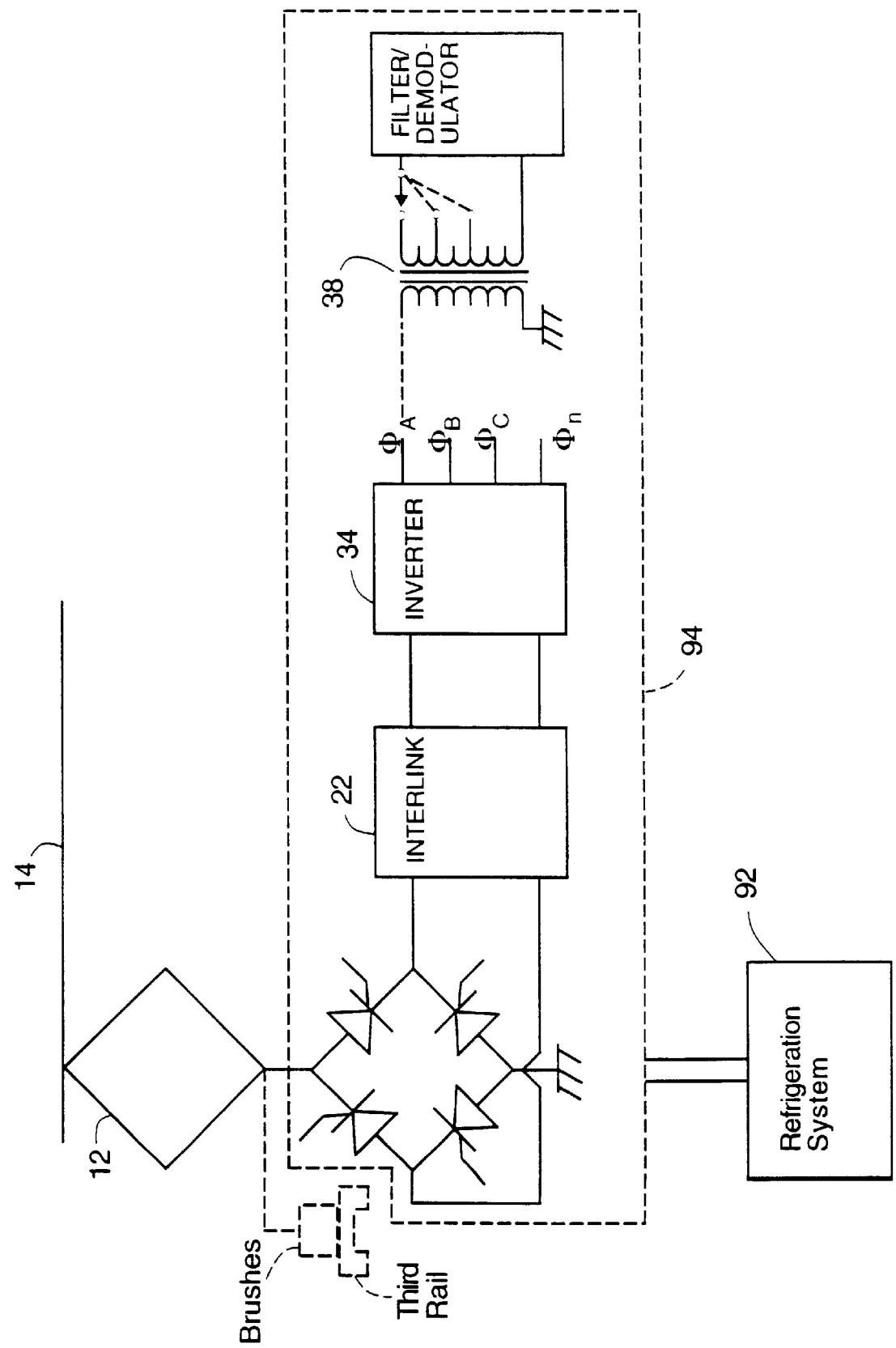
FIG. 8 is a sixth embodiment of a circuit for driving an induction motor in accordance with the invention.

Referring to FIG. 8, a more detailed electrical schematic illustrates operation of the system in accordance with one embodiment of the invention. As before, a pantograph 12 receives power from the overhead line 14 and directs it to rectifier circuitry 30. The rectifier circuitry, here a full-wave rectifier, delivers the rectified output over a line 32 to a superconducting inductor 36 and capacitor 37 (which form the interlink circuit). Preferably, as shown, the rectifiers can be silicon controlled rectifiers (SCR's) which provide further flexibility to the circuit by enabling the input energy (and in effect average DC voltage) to be conveniently controlled (with the interlink circuit 22 performing the necessary smoothing functions). The relatively constant voltage output of the interlink circuit 22 is delivered to the down converter or inverter 34.

Figure 9:
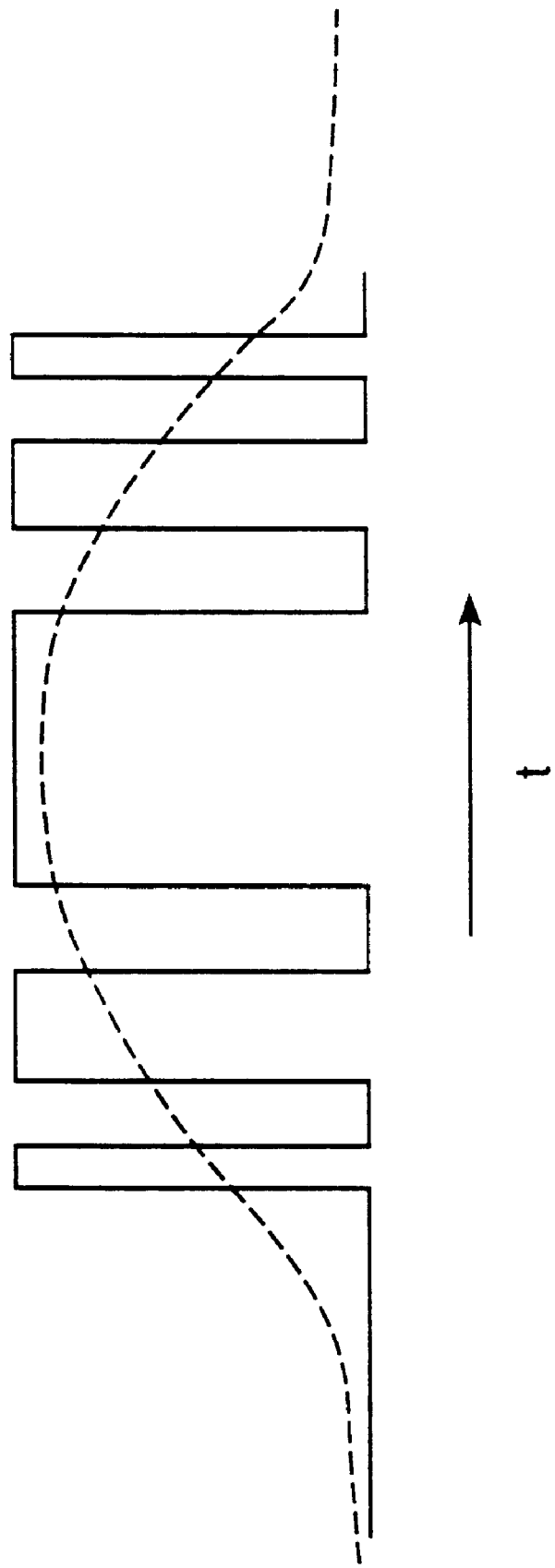
FIG. 9 illustrates various signals of the circuit of FIG. 8.

The voltage output from inverter 34 can have the general appearance illustrated in FIG. 9, and is applied to the primary of high frequency superconducting transformer 38. The secondary of transformer 38 has a plurality of taps 80 to provide a variable voltage signal, as needed, and is filtered/demodulated by circuitry 82. The filtered output of circuit 82 is fed to a load 84, for example, a load consisting of an adjustable speed control device 90 for driving the induction motor 44.

A refrigeration system 92 provides the necessary cooling to a vessel, designated as 94, in which the electronics for this system, including the superconducting elements, have been placed. The refrigeration system maintains the vessel 94, which provides a protective environment for the components housed within it, at one or more temperatures depending upon the requirements of the system. Thus, HTS components will be maintained in one chamber at 77 K to ensure that the superconducting inductors and coils remain in a superconducting state, and other components can be actively cooled to, for example, a temperature less than the dew point of the outside air, preferably less than 230 K, to improve operation of the semiconductor and capacitive elements in the system.

As noted above, various elements of the system can be present or not depending upon the particular needs of the system. Thus, inductor 36 and/or capacitor 37 need not be present if, for example, the input is DC; the high-frequency transformer provides step up or step down of the voltage, can have a set of taps but may not be needed for that purpose or for the galvanic isolation that it provides; the regenerative path indicated by line 98 may not be provided depending upon the nature of the application to which the variable input drive is put; and the rectifier circuitry 30 may be a half-wave rectifier or may use other rectification elements depending upon the application.

While not shown, a second power supply circuit may also be provided which generates the low level signal control and chopper control signals for semiconductor elements 80 and 86 (typically Mosfets). Such a system is well known in the art.

As noted above, in connection with FIG. 4, the high frequency transformer can be eliminated, particularly where isolation between the incoming power and the induction motor is not necessary. Where the high frequency transformer 38 is employed, it is preferred that its superconducting windings, like those of the inductors 34, use BSCCO as the superconducting material as has been well described and documented in the art. A typical paper describing the superconducting characteristics of BSCCO, at 77 K is Malezemoff, Kiev Applied Superconductivity Conference. Similarly, perovskites of structure $A_2B_2O_7$ can be used as the superconducting material for a capacitor device as capacitors are employed in the described system.

As is further well known in the art, MOSFETS can be replaced by other semiconductor materials such as bipolar IGFET's, GTO, and other power devices in circuit configuration with the other available elements. Further, the cryocooler of the present invention can be any of those either commercially available, or can be especially built as is well know in the art for this large scale application.

The down converters (or up converter of FIG. 6), which perform modulation or chopping of the DC input, collectively, the inverters, in addition to being the Buck converter or resonant mode device that was described above, can be any of other conversion elements having advantageous characteristics when cryocooled, including, for example, a CUK converter as illustrated in U.S. Pat. No. 5,347,168, or simply multiples of 6-step converters, or the invention described in copending U.S. Application Serial No., entitled CRYOGENICALLY COOLED SWITCHING CIRCUIT, filed, in the names of C. Gold and O. Muller.

Additions, subtractions, and other modifications of the claimed invention will be apparent to those skilled in the art.

What is claimed is:

1. A method for powering a high power load from an AC or DC voltage source comprising the steps of:
   rectifying any AC input power for generating a first DC output power signal,
   storing energy in an interlink,
   modulating said DC output power signal at a high frequency,
   transforming said high frequency power signal to a selected voltage level,
   applying said transformed power signal to said load, and
   actively cooling at least elements effecting said modulating step.

2. The method of claim 1 further comprising the step of:
   operating said load at a power level in excess of 100 watts.

3. The method of claim 1 further comprising the step of:
   operating said load at a power level in excess of 50,000 watts.

4. The method of claim 2 further comprising the step of:
   cryocooling elements effecting said transforming step.

5. An apparatus for operating a high power load of at least 100 watts from an AC or DC power source, said apparatus comprising
   a rectifier for rectifying any AC input power to generate a first DC output power signal,
   an inverter for receiving an output of said rectifier and generating a high power high frequency signal from said rectifier output, a high frequency transformer transforming said high frequency signal to a selected voltage level, a cooling system for actively cooling at least said inverter, whereby said transformer output signal can be applied to drive said load.

6. The apparatus of claim 5 further comprising an interlink energy storage circuit receiving and acting upon said first DC signal to generate an input to said inverter, and a filter for filtering said transformed signal before applying it to said load.

7. The apparatus of claim 5 wherein said transformer is comprised of a high temperature superconductor, and said cryogenic cooling system can cool said transformer to superconducting temperatures.

8. The apparatus of claim 5 further comprising a by-pass switch for by-passing said rectifier when said source voltage is a DC voltage.

9. The apparatus of claim 5 wherein said transformer is a down-converting transformer.

10. The apparatus of claim 5 wherein said transformer is an up-converting transformer.

11. The apparatus of claim 5 wherein said transformer has a secondary having a plurality of voltage taps, and means for applying the voltage at one of said taps to said load.

12. The apparatus of claim 5 further comprising a protective vessel providing a protective environment for said actively cooled components of said apparatus.

13. A method for powering a high power load comprising the steps of:

receiving an AC input power from any one of a plurality of different voltage AC sources, the AC sources having a frequency in a range of allowable AC frequencies, rectifying the AC input power to generate a first DC output power signal, modulating said DC output power signal at a high frequency, transforming said high frequency power signal to a selected voltage level, and applying said transformed power signal to said load.

14. The method of claim 13 further comprising the steps of interlinking said first DC output power signal to said modulating step using an energy storage component, and actively cooling at least the circuitry for effecting said modulation step.

15. The method of claim 14 further comprising the step of:

filtering said transformed high frequency signal before applying it to said load.

16. The method of claim 14 wherein said transforming step uses a superconducting transformer and further comprising the step of operating said transformer in a superconducting mode of operation.

17. The method of claim 14 further comprising the step of protectively enclosing at least the actively cooled components in a controlled environment.

18. The method of claim 17 further wherein said applying step comprises the step of applying at least 100 watts to said load.

19. An apparatus for operating a high power load, said apparatus comprising a rectifier configured to receive an input from any one of a plurality of different power sources, the power sources including AC sources having a range of voltage and frequency and to rectify an AC input power to generate a first DC output power signal, an inverter for receiving an output of said rectifier and generating a high power, high frequency signal from said inductor output, a high frequency transformer transforming said high frequency signal to selected voltage level, whereby said transformed filtered signal can be applied to drive said load.

20. The apparatus of claim 19 further comprising an interlink energy storage circuit for receiving and acting upon said first DC signal and delivering its output to the inverter, and a filter for filtering said transformed signal and applying the filtered signal to the load.

21. The method of claim 1 wherein actively cooling at least elements effecting said modulating step includes cooling at cryogenic temperatures.

22. The method of claim 21 wherein the cryogenic temperatures are less than 230° K.

23. The method of claim 22 wherein the cryogenic temperatures are less than 180° K.

24. The apparatus of claim 5 wherein the cooling system is configured to actively cool at least the inverter at cryogenic temperatures.

25. The apparatus of claim 24 wherein the cryogenic temperatures are less than 230° K.

26. The apparatus of claim 25 wherein the cryogenic temperatures are less than 180° K.

27. The method of claim 13 further comprising actively cooling at least elements effecting said modulating step includes cooling at cryogenic temperatures.

28. The method of claim 27 wherein the cryogenic temperatures are less than 230° K.

29. The method of claim 28 wherein the cryogenic temperatures are less than 180° K.

30. The apparatus of claim 19 further comprising a cooling system is configured to actively cool at least the inverter at cryogenic temperatures.

31. The apparatus of claim 30 wherein the cryogenic temperatures are less than 230° K.

32. The apparatus of claim 31 wherein the cryogenic temperatures are less than 180° K.

* * * * *